UNITED STATES PATENT OFFICE.

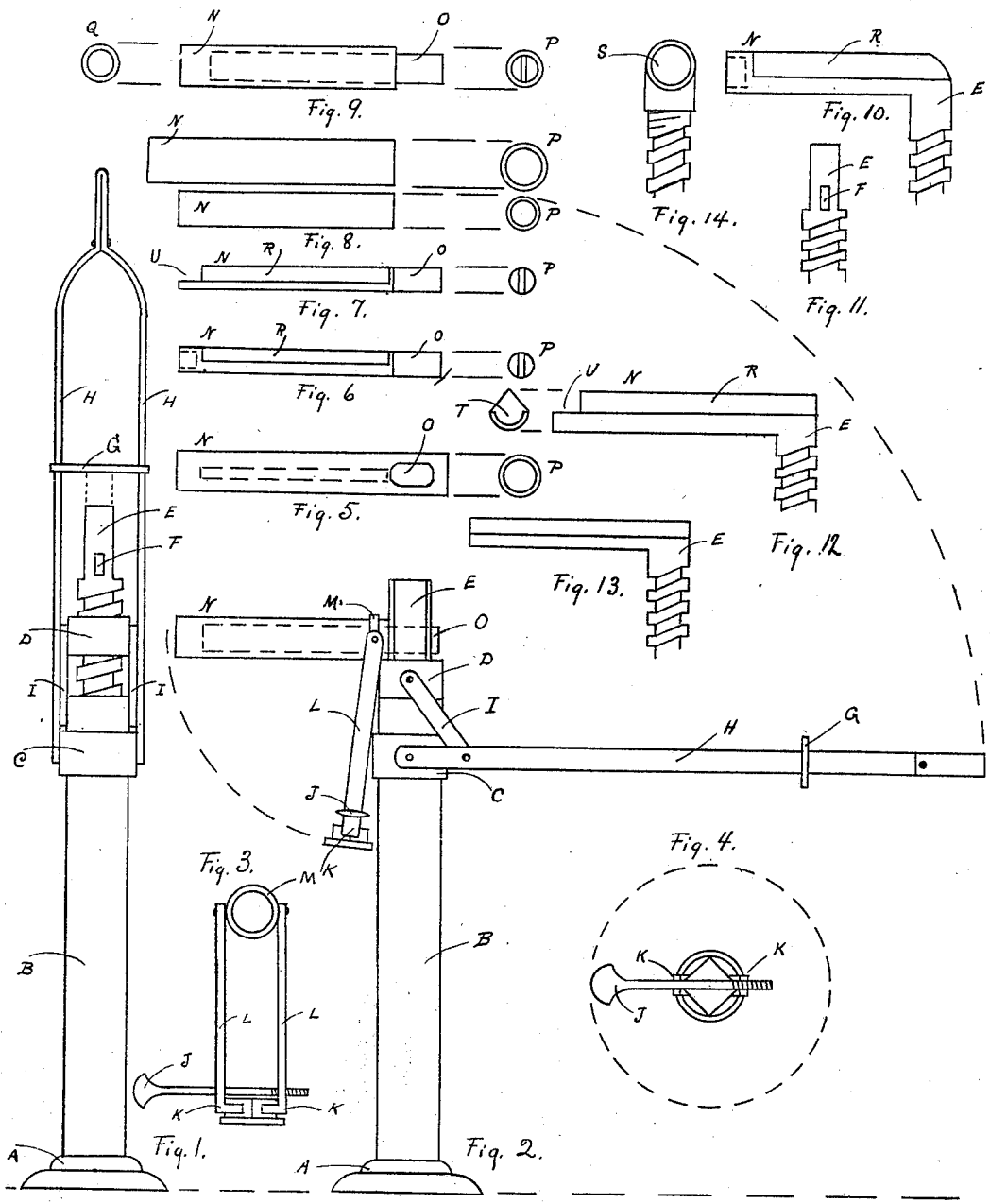

CHARLES MALCOLM FARBER, OF CHRISTIANSBURG, VIRGINIA, ASSIGNOR OF ONE-THIRD TO MARGARET HARTWELL STUART, OF LONGBEACH, CALIFORNIA.

COMBINED WHEEL-HOIST, WHEEL-REST, THIMBLE-SCRAPE, NUT-CLUTCH, &c.

SPECIFICATION forming part of Letters Patent No. 699,671, dated May 13, 1902.

Application filed February 6, 1901. Serial No. 46,235. (No model.)

*To all whom it may concern:*

Be it known that I, CHARLES MALCOLM FARBER, a citizen of the United States, residing at Christiansburg, in the county of Montgomery and State of Virginia, have invented a Combined Wheel-Hoist, Wheel-Rest, Thimble-Scrape, Nut-Clutch, and, Incidentally Thereto, a Multiplex Adjustment, of which the following is a specification.

My invention relates to the manipulation of the wheels of vehicles and to the making of adjustments in a mechanical way and wherever adapted, my object being, first, to provide an efficient adjustable mechanical appliance, constructed wholly of metal, adapted to clutch, remove, hold, and replace the spindle-nut, to hoist, support, and lower the axle with the wheel thereon, to remove, rest, and replace the wheel, and to scrape the interior of the thimble; secondly, to afford a means for making adjustments at various positions. I attain these objects by the mechanism illustrated in the accompanying drawings, in which—

Figure 1 is a front or rear elevation of the hoist hoisted and a desired adjustment effected. Fig. 2 is a side elevation of the hoist unhoisted unadjusted, one form of wheel-rest in place with nut-clutch dependent. Fig. 3 is a plan view of the nut-clutch. Fig. 4 is a detailed plan of the nut-clutch jaws. Fig. 5 is a top view of slotted cylindrical wheel-rest with interior supports, showing projection of either end. Fig. 6 is a side elevation of solid wheel-rest with thimble-scrape thereon, showing projection of rear end. Fig. 7 is a side elevation of solid wheel-rest and thimble-scrape with supporting-rib, showing projection of rear end. Fig. 8 is a top or side view of sleeve form of cylindrical wheel-rest, showing projection of either end. Fig. 9 is a side elevation of cylindrical wheel-rest with supporting-bar protruding at rear end, showing projection of both ends. Fig. 10 is a side elevation of a combined interchangeable adjustment screw-rod, wheel-rest, and thimble-scrape. Fig. 11 is a front or rear elevation of one form of interchangeable adjustment screw-rod. Fig. 12 is a side elevation of one form of combined interchangeable adjustment screw-rod, wheel-rest, and thimble-scrape. Fig. 13 is a side elevation of a combined interchangeable adjustment screw-rod and wheel-rest-supporting arm. Fig. 14 is a front or rear elevation of one form of interchangeable adjustment screw-rod.

Similar letters refer to similar parts throughout the several views.

In the foot-flange A, Figs. 1, 2, is fixed the cylindrical base B, over which is slipped the short sleeve C, through and on opposite sides of which and the base B, near the upper end, is attached the double-bar lever H H, with a handle, having the straps I I at one end, attached on the inside to and near the end of each bar and at the other to opposite sides of the threaded nut D, through which run any of certain forms of interchangeable adjustment screw-rods E, Figs. 1, 2, 10, 11, 12, 13, 14, slip-fitting in the base B, by manipulation raised or lowered for adjustment by screwing up or down through the nut D, and is segmentally cut away on opposite sides of the head to receive exteriorly-slotted cylindrical wheel-rest, Fig. 5, and diametrically slotted at right angles at F, Fig. 1, to receive interiorly other forms of wheel-rests, Figs. 2, 6, 7, 9. The lever-catch G when in place down over the head serves the double purpose of maintaining the lever perpendicular on the dead-center and preventing the adjustment screw-rod from running down. (See straight dotted lines, Fig. 1.)

On opposite sides of the narrow flat ring M, Figs. 2, 3, are attached two opposite clutch-bars L L at the one end, having the other fitted with opposing V-shaped jaws at right angles K K, closed or opened by the thumb-screw handle J.

Form of wheel-rest Fig. 5 is a metal cylinder with or without an interior supporting-bar of flat metal (indicated by straight dotted lines) having opposite oblong slots at O to be set down over the head E of the interchangeable adjustment screw-rod E, Figs. 1, 2, 11.

Form of wheel-rest Fig. 6 is a short round metal bar segmentally cut away at O to fit slot F, Figs. 1, 2, 11, also from a top central longitudinal line forming a cutting edge constituting the thimble-scrape R, Figs. 6, 7, 10, 12, the end N being hollowed, (indicated by straight dotted lines,) threaded, or blank to receive and support the spindle-screw on the end of the axle.

Form of wheel-rest Fig. 7 is identical with Fig. 6, only that it is cut away at U, forming a projecting rib, of which T, Fig. 12, is a projection to support the spindle-screw on the end of the axle.

Form of wheel-rest Fig. 9 is a metal cylinder, with interior flat metal supporting-bar partially inserted (indicated by the dotted lines) and partially protruding at O.

The combined interchangeable adjustment screw-rod, wheel-rest, and thimble-scrape Fig. 10 is a combination of the adjustment screw-rod E, Figs. 1, 2, 11, with solid wheel-rest and thimble-scrape Fig. 6, another form, Fig. 12, combining the adjustment screw-rod E, Figs. 1, 2, 11, with solid wheel-rest and thimble-scrape R, Fig. 7, having the supporting concavo-convex rib U, Figs. 7, 12, of which T, Fig. 12, is a projection.

The solid supporting-arm combined with the adjustment screw-rod, Fig. 13, receives exteriorly and supports the sleeve form of wheel-rest, Fig. 8, the arm being segmentally cut away from both sides of a top central longitudinal line forming a cutting edge to prevent the sleeve from slipping laterally or longitudinally and is designed to receive exteriorly large and larger long and longer sleeves one over the other to accommodate large and larger long and longer thimbles.

The sleeve form of wheel-rest, Fig. 8, with or without a flat metal interior supporting-bar, is used interiorly when set in the circular orifice S, Fig. 14, extending through the fitting at right angles to the adjustment screw-rod on the top of which it is screwed.

To use, the hoist is placed at the side of the wheel, lever horizontal, catch run out on lever-bars, bringing the wheel-rest to a level with the spindle-nut by manipulating the screw-rod up or down and raising the nut-clutch to a horizontal position parallel with the wheel-rest. The jaws are clutched on opposite corners of the spindle-nut by the thumb-screw handle, which being revolved removes the nut, the clutch retaining it being dropped by the side of the hoist. (See Fig. 2.) The spindle-screw being inserted in the end of the wheel-rest, the hoist is effected by raising the lever to a perpendicular position and secured in position by the catch. The wheel is shifted from the axle to the wheel-rest on which it is revolved to scrape the interior of the thimble, rested or shoved to place on the axle, which is lowered by lifting the catch and dropping lever to a horizontal position H, Fig. 2.

The multiplex adjustment is comprised in the various adjustments possible to be effected by turning laterally or shifting longitudinally and setting the short sleeve C on the cylinder B by manipulating the adjustment screw-rod E and the lever-bars H H, Fig. 1.

I claim as my invention and desire to secure by Letters Patent—

1. In a wheel-hoist the combination of a standard, a screw-rod slidably mounted therein, a nut carried on said screw-rod, a lever mounted at one end on said standard, and links connecting said nut and lever all substantially as set forth.

2. A wheel-hoist consisting of a standard, a double-bar lever pivoted at one end to opposite sides thereof, means carried by said lever for holding the latter in an elevated position, an adjustable screw-rod slidable in said standard, a nut carried by said screw-rod, links pivotally connected to said nut and lever, and a wheel-rest horizontally supported by the upper portion of said screw-rod, all substantially as set forth.

3. A wheel-hoist consisting of a standard, an adjustable screw-rod slidable therein, a nut carried on said screw-rod, a double-bar lever pivoted to opposite sides of said standard, links connecting said nut and lever said lever having a plate slidable thereon said plate having an aperture therein adapted to fit over the upper end of said screw-rod to hold the lever in elevated position and a wheel-rest horizontally supported by the upper portion of the said screw-rod, all substantially as set forth.

4. A wheel-hoist consisting of a standard, a double-bar lever pivoted to opposite sides thereof, means carried by said lever for holding the latter in an elevated position, an adjustable screw-rod slidable in said standard, a nut carried by said screw-rod, links pivotally connected to said nut and lever, and a wheel-rest having a sharp upper edge thereon, horizontally supported by the upper portion of said screw-rod, all subtantially as set forth.

5. A wheel-hoist consisting of a standard a double-bar lever pivoted at one end to opposite sides thereof means carried by said lever for holding the latter in elevated position, an adjustable screw-rod slidable in said standard, a nut carried by said screw-rod, links pivotally connected to said nut and lever, and a wheel-rest having means at its outer end to receive and support the end of a vehicle-spindle and horizontally supported by the upper portion of said screw-rod, all substantially as set forth.

6. A device of the character described comprising a standard, a rod slidable therein, means for adjusting said rod, a support horizontally held by the upper portion of said rod, a ring rotatably mounted on said support, two bars pivoted to opposite sides of said ring and means for clamping the free ends of said bars together, all substantially as set forth.

7. A wheel-hoist comprising a base-piece, a hollow standard supported thereby, a collar fixed to said standard, a screw-threaded rod slidably mounted in said standard and having a projection at its upper end, a threaded nut mounted upon said rod, a double-bar lever pivotally connected at one end with said collar links pivotally connected to said nut and to said lever intermediate its ends, a latch for said lever consisting of a plate slidable thereon and having an aperture adapted to fit over the projection upon the screw-rod in order to hold the lever and thereby the screw-rod in elevated position, said rod having a transverse aperture near its upper end, a wheel-rest horizontally carried by said rod and consisting of a thin flat bar, one end of which is adapted to enter the aperture in the screw-rod, a support carried by said bar, said support having means at its outer end to receive the threaded end of a vehicle-spindle, all substantially as set forth.

In testimony whereof I have signed my name in the presence of two witnesses.

CHARLES MALCOLM FARBER.

Witnesses:
MARGARET H. STUART,
WILLIAM C. STUART, Jr.